United States Patent [19]
Booth et al.

[11] 3,942,150
[45] Mar. 2, 1976

[54] CORRECTION OF SPATIAL NON-UNIFORMITIES IN SONAR, RADAR, AND HOLOGRAPHIC ACOUSTIC IMAGING SYSTEMS

[75] Inventors: Newell O. Booth; Benjamin A. Saltzer; James V. Thorn; Jerry L. Sutton, all of San Diego, Calif.

[73] Assignee: The United States of America as represented by the Secretary of the Navy, Washington, D.C.

[22] Filed: Aug. 12, 1974

[21] Appl. No.: 496,599

[52] U.S. Cl.................... 340/5 H; 340/5 C; 343/17
[51] Int. Cl.² .......................................... G01S 9/66
[58] Field of Search............ 340/5 C, 5 H, 15.5 DS; 343/17

[56] References Cited
UNITED STATES PATENTS
3,852,709 12/1974 Mueller...................... 340/15.5 DS Primary Examiner—Richard A. Farley
Attorney, Agent, or Firm—Richard S. Sciascia; Ervin F. Johnston; William T. Skeer

[57] ABSTRACT

An improved method and apparatus for processing electronic signals for use in establishing an improved image display includes storing the electronic and acoustic response of all the detectors in response to impingement thereon by a plane wave-front as stored in a memory. In the operational environment, these stored signals are combined with the transducer response and the signals are combined in such a fashion as to compensate for spatial nonuniformities.

14 Claims, 7 Drawing Figures

CORRECTION OF SPATIAL NON-UNIFORMITIES IN SONAR, RADAR, AND HOLOGRAPHIC ACOUSTIC IMAGING SYSTEMS

Statement of Government Interest

The invention described herein may be manufactured and used by or for the Government of the United States of America for governmental purposes without the payment of any royalties thereon or therefor.

FIELD OF THE INVENTION

This invention pertains to the field of electronics. More particularly, this invention pertains to the field of signal processing. In still greater particularity, this invention pertains to the field of signal processing as it is used in detection systems. Finally, but without limitation thereto, this invention pertains to signal processing from electroacoustic transducers to enhance holographic imaging.

DESCRIPTION OF THE PRIOR ART

Holographic imaging techniques have proven to be a valuable adjunct to the electrical echo ranging arts. Particularly, in the electroacoustic ranging arts, commonly embracing the field of sonar, these techniques have proven especially valuable. However, the creation of an image having acceptable contrast and sharpness depends to a high degree upon the precision of manufacture of the electroacoustic transducer array used in obtaining the raw data. That is, a requirement exists that the individual transducers be located along a predetermined spatial relation with near-optical instrument precision to obtain a satisfactory image.

Because the conditions imposed by transporting electroacoustic arrays to the situs where electroacoustic imaging is desired and the arduous operational conditions found there are so severe, transducer arrays able to withstand such transportation and operational placement are extremely expensive and must be handled with great care. Despite the precision available in modern assembly operations, frequently such arrays produce disappointing imaging capabilities when deployed. Because of the attendant high cost of precision manufacture and the disappointing performance obtained from such costly units, the applications of acoustic holography have seldom achieved the hoped for imaging acuity.

SUMMARY OF THE INVENTION

The invention employs an electroacoustic transducer array of conventional manufacture and rigidity which may be more conveniently transported and deployed, and a signal processing system to correct the expected spatial nonuniformities inherent in such a system. The basis of this signal processing is the recordation of a corrective signal derived from the actual array and its response to a plain wavefront signal as a corrective factor for signals having nonplanar propagation wavefronts.

STATEMENT OF THE OBJECTS OF THE INVENTION

It is an object of this invention to provide an improved, electronic signal processing system and process.

A further object of this invention is to provide a signal processing method and system to correct for spatial nonuniformities.

A further object of this invention is the provision of a signal processing system and method of combining a plurality of sensor inputs and recorded correction signals therefor.

These and other objects of the invention will become more readily apparent from the ensuing specification when taken together with the drawings.

DESCRIPTION OF THE PREFERRED EMBODIMENT

Figure 1:
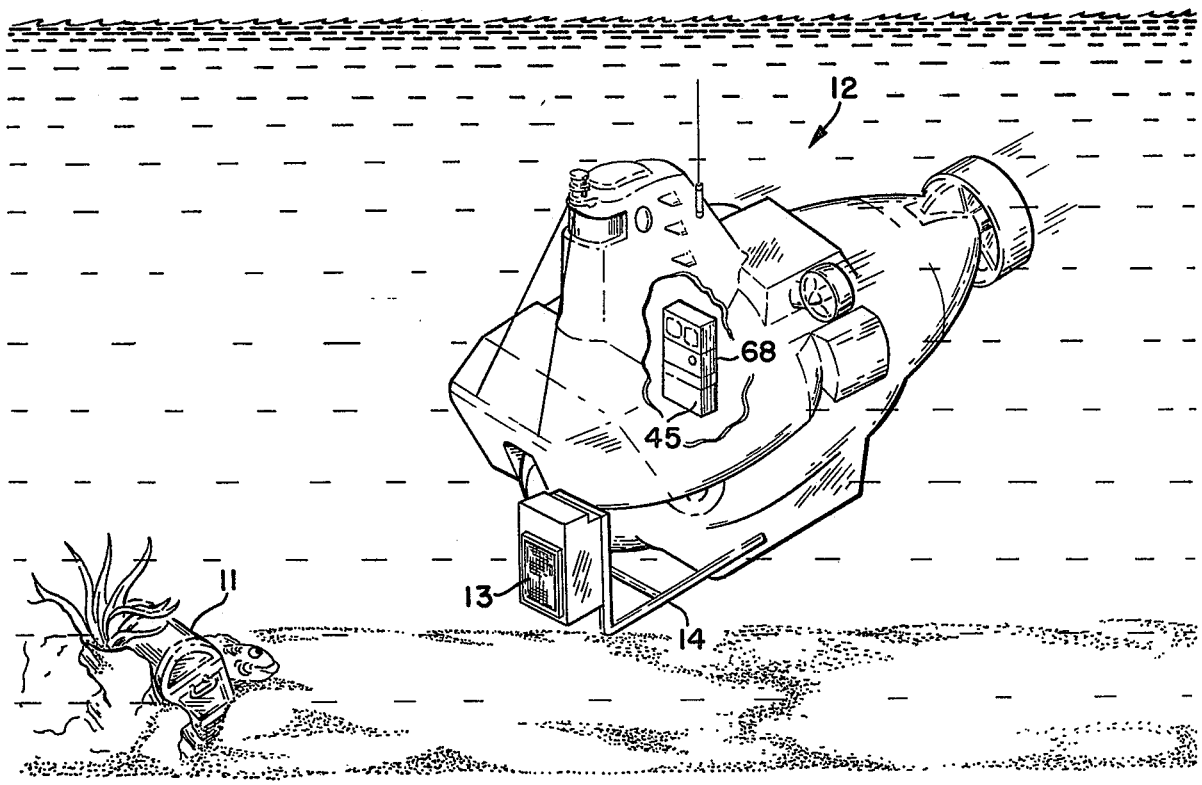
FIG. 1 is a perspective view showing the invention in its operational environment.

Referring to FIG. 1, an underwater object 11, which may be, for example, a submarine treasure, is shown being approached by an underwater vehicle 12. Transducer array 13 is mounted on the foreward portion of vehicle 12 which houses electronic circuitry indicated at 45 and 68, to be more completely described. Transducer array comprising individual transducers 13 and projector 13' are attached to vehicle 12 by a support 14. Suitable connection is made to the individual transducers 13 by means of an electrical conductor, not shown, which makes conventional connection with the transducers. A variety of such transducers are known in the acoustic arts and choice among then is based upon other operational parameters of the system such as frequency and power considerations. However, for purposes of completeness, it should be noted that the transducer arrangement disclosed in "An Experimental Holographic Acoustic Imaging System", *Acoustic Holography*, Vol. IV, Plenum Press, 1972, by N. Booth and B. Saltzer, may be used to good effect in the practice of the invention.

Similarly, the electrical conductor may be any conventional oceanographic cable capable of withstanding the pressures of the ocean environment and the other operational conditions. As an example of such a construction, attention is invited to the cable illustrated in FIG. 7 of U.S. Pat. No. 3,458,855 which issued on July 29, 1969, to Albert E. Wallen for "Underwater Acoustic Generator with Variable Resonant Frequency".

Figure 2:
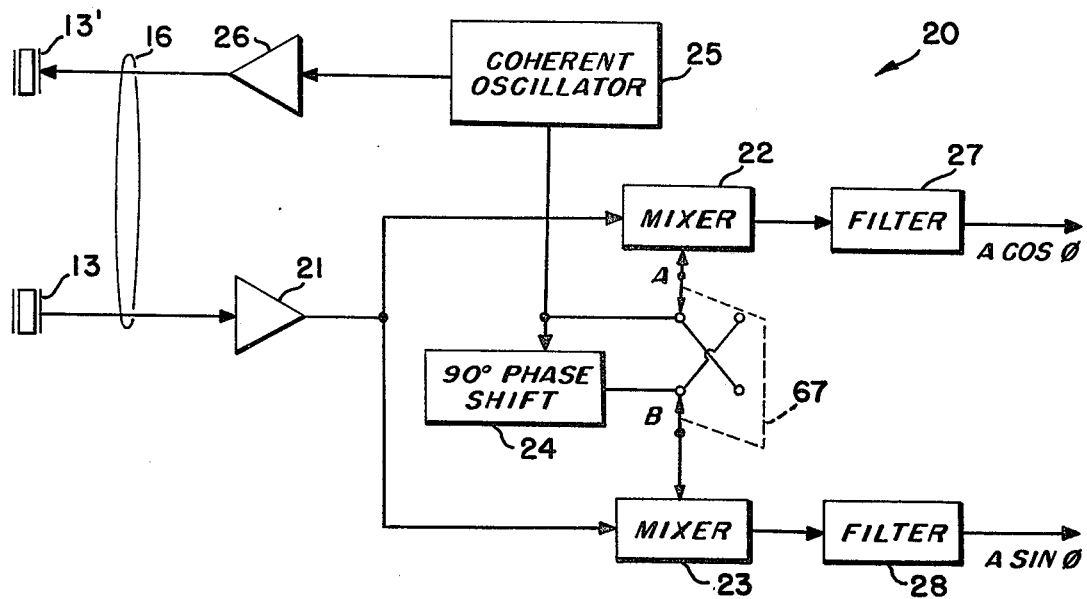
FIG. 2 is a diagrammatic illustration of one form of transducer signal utilization system.

Referring to FIG. 2, hydrophone transducer 13 is connected to a preamplifier 21. The output of preamplifier 21 is connected to two mixers 22 and 23. Mixer 22 also receives an input from coherent oscillator 25. Oscillator 25 also is connected to amplifier 26 which, in turn, drives transducer 13'. The output of mixer 22 is filtered by a filter 27 to produce a signal corresponding to the product of the amplitude of the received signal on the hydrophone 13 and the cosine of the phase output of coherent oscillator 25.

Similarly, mixer 23 receives the output of coherent oscillator 25 via a 90° phase shifting network 24 to produce an output filtered by filter 28 corresponding to the amplitude of the received signal times the sine of the phase signal.

Figure 3:
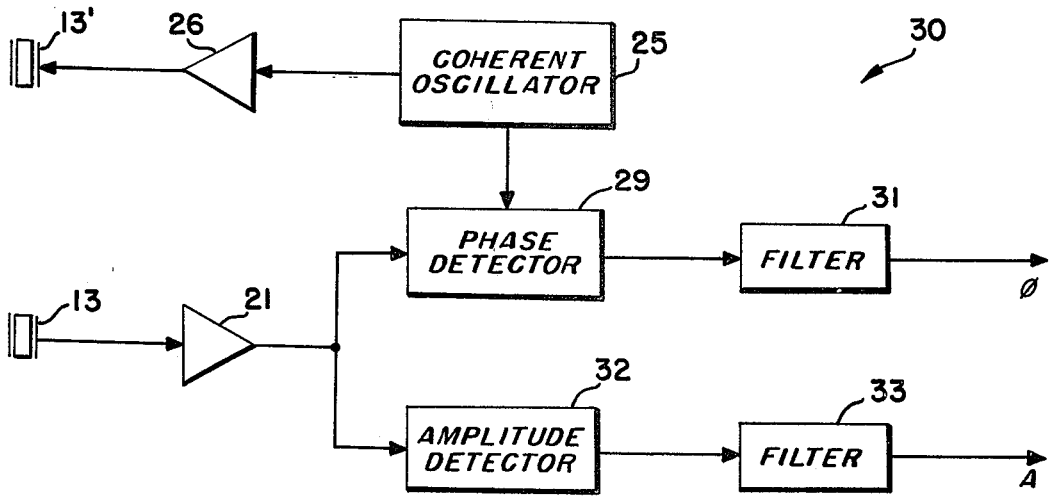
FIG. 3 illustrates an alternative transducer signal processor.

Referring to FIG. 3, a diagrammatic illustration of another type of transducer coupler is illustrated. In this arrangement, a signal representative of the phase of the received signal in comparison with the transmitted signal and of the amplitude of the received signal is obtained. In this arrangement, the output from preamplifier 21 is fed into a phase detector 29 which compares the phase of the received signal with the output from coherent oscillator 25 and produces a phase signal which is filtered by filter 31, indicated as $\phi$. Second output from preamplifier 21 is fed to amplitude detector 32 which has its output filter by means of filter 33 to produce an amplitude signal indicated at A.

Either of the two aforedescribed detector arrangements may be used in the practice of the invention. However, it should be noted that in cases where phase differences of approximately 360° are encountered, difficulties are experienced with the phase signal becoming unstable in these regions. Accordingly, system of FIG. 2 is generally more satisfactory in general applications, however, with appropriate phase detection equipment which is stable in the aforedescribed transition area, either circuit will perform satisfactorily.

Since both of these detection arrangements are known in the prior art, further detailed description thereof is not deemed warranted. For example, one application of the amplitude phase arrangement is disclosed by U.S. Pat. No. 3,246,327 issued on Apr. 12, 1966, to George J. Vogel for "Multiple Object Detecting Radar System Using Phased Array".

As is well understood in the ranging and imaging arts, the output of either of the above signals may be processed directly to produce the desired image display. However, the aforedescribed requirements for precision of mounting the various hydrophones and the necessity of obtaining electrically identical circuitry causes a loss of resolution and image contrast. For a more complete discussion of this phenomena, attention is invited to the article "Gain and Phase Variations in Holographic Acoustic Imaging Systems", by James V. Thorn, which appeared in *Acoustic Holography*, Vol. IV, edited by Glenn Wade, Plenum Press, 1972.

Although a detailed discussion may be obtained from the foregoing article, a semi-catechistic discussion of the two circuits is believed to be in order at this juncture.

Holographic data from a two dimensional array with the utilization circuit of FIG. 2 can be represented by:

$$S_H(x,y) = \delta(x,y) A(x,y) \sin(\phi(x,y) + \beta(x,y)) \quad (1)$$

$$C_H(x,y) = \epsilon(x,y) A(x,y) \cos(\phi(x,y) + \alpha(x,y)) \quad (2)$$

where
$A(x,y)$ is the amplitude of the wave incident on the sensor at position $x,y$;
$\phi(x,y)$ is the phase of the wave incident on the sensor at position $x,y$.
$\epsilon(x,y)$ and $\delta(x,y)$ represent errors in the hydrophone sensitivity and errors in the gain for the electronics at position $x,y$. $\alpha(x,y)$ and $\beta(x,y)$ are phase errors introduced by nonflatness in the array and by phase nonuniformities in sensor and electronic responses.

These phase and gain errors severely limit the contrast in the reconstructed image. Their effects can be eliminated by measuring the errors and correcting for them. The measurement of the errors may be accomplished by taking holographic data from a plane wave normally incident to the array. This plane wave may be generated by an active point source in the far field of the array. The holographic data thus obtained is expressed as $$S_o(x,y) = \delta(x,y) B \sin(\theta + \beta(x,y)) \quad (3)$$

$$C_o(x,y) = \epsilon(x,y) B \cos(\theta + \alpha(x,y)) \quad (4)$$

where $B$, the amplitude, and $\theta$, the phase, are uniform across the array. Repeating the above measurement with the reference waves (signals A and B) interchanged through switch 67, we obtain $$S_{90}(x,y) = \delta(x,y) B \cos(\theta + \beta(x,y)) \quad (5)$$

$$C_{90}(x,y) = \epsilon(x,y) B \sin(\theta + \alpha(x,y)) \quad (6)$$

A similar result can be obtained if the phase of the plane wave is shifted by 90°. Using Equations (3) through (6), we can theoretically solve for the unknown errors $\epsilon(x,y)$, $\delta(x,y)$, $\alpha(x,y)$ and $\beta(x,y)$, and eliminate them from Equation (1). In practice, this is difficult to do. If we assume that $\alpha(x,y)$ and $\beta(x,y)$ are small (less than 20°), then the following equations for corrected cosine data $C_c(x,y)$ and corrected sine data $S_c(x,y)$ eliminate the gain errors ($\epsilon$ and $\delta$) and, to the first order, the phase errors ($\alpha$ and $\beta$).

$$S_c(x,y) = \frac{D^2 S_H(x,y)}{S S_o(x,y) + C S_{90}(x,y)} +$$

$$\left\{ \left[ \frac{S_{90}(x,y)}{2S} - \frac{S_o(x,y)}{2C} \right] \frac{D^2}{SS_o(x,y) + CS_{90}(x,y)} + \frac{S}{2C} - \frac{C}{2S} \right\}$$

$$\frac{D^2 C_H(x,y)}{CC_o(x,y) + S C_{90}(x,y)} \quad (7)$$

$$C_c(x,y) = \frac{D^2 C_H(x,y)}{CC_o(x,y) + SC_{90}(x,y)} +$$

$$\left\{ \left[ \frac{C_{90}(x,y)}{2C} - \frac{C_o(x,y)}{2S} \right] \frac{D^2}{CC_o(x,y) + SC_{90}(x,y)} - \frac{S}{2C} + \frac{C}{2S} \right\}$$

$$\frac{D^2 S_H(x,y)}{SS_o(x,y) + CS_{90}(x,y)} \quad (8)$$

where $S$, $C$, and $D^2$ are obtained by $$S = \sum_x \sum_y \frac{S_o(x,y) + C_{90}(x,y)}{2 N_x N_y} \approx B \sin \theta \qquad (9)$$

$$C = \sum_x \sum_y \frac{C_o(x,y) + S_{90}(x,y)}{2 N_x N_y} \approx B \cos \theta \qquad (10)$$

$$D^2 = S^2 + C^2 \qquad (11)$$

and where $N_x$ and $N_y$ are the number of columns and rows of sensors. Equations (7) and (8) approximate the actual aperture data to second order in the phase errors $\alpha$ and $\beta$. Processing $S_c$ and $C_c$ will generate images whose dynamic range is greater because of the elimination of much of the spatial noise.

The block diagram for a Phase-Amplitude configuration of detecting electronics is shown in FIG. 3. The holographic data from a two dimensional array with Phase-Amplitude signal processing can be represented by $$A_H(x,y) = \gamma(x,y) A(x,y) \qquad (12)$$

$$\phi_H(x,y) = \sigma(x,y)(\phi(x,y) + \xi(x,y)) \qquad (13)$$

where $\gamma(x,y)$ represents the errors in sensitivity of the sensor and amplitude channel gain;

$\xi(x,y)$ represents phase errors introduced by nonflatness in the array and by phase nonuniformities in the hydrophones;

$\sigma(x,y)$ represents gain nonuniformities in the phase channel.

The effects of these errors can be eliminated by measuring the hologram of a plane wave under the same conditions as are described above. The data obtained can be represented as $$A_o(x,y) = \gamma(x,y) B \qquad (14)$$

$$\phi_o(x,y) = \sigma(x,y)(\theta + \xi(x,y)) \qquad (15)$$

A similar measurement with either the reference wave or the signal driving the point source shifted by 90° yields.

$$\phi_{90}(x,y) = \sigma(x,y)(\theta + \xi(x,y) \pm 90°) \qquad (16)$$

If we use the following equations to calculate the corrected data, the errors may be eliminated.

$$A_c(x,y) = \frac{A_H(x,y)}{A_o(x,y)} \overline{A_o} \qquad (17)$$

$$\phi_c(x,y) = \frac{\pm 90°(\phi_H(x,y) - \phi_o(x,y))}{\phi_{90}(x,y) - \phi_o(x,y)} + \overline{\theta} \qquad (18)$$

where $\overline{A}_O$ and $\overline{\theta}$ are given by $$\overline{A_o} = \sum_x \sum_y \frac{A_o(x,y)}{N_x N_y} \qquad (19)$$

$$\overline{\theta} = \sum_x \sum_y \frac{\phi_o(x,y)}{N_x N_y} \qquad (20)$$

The constants $\overline{A}_o$ and $\overline{\theta}$ in Equations (17) and (18) have no effect on the reconstructed image since they are independent of $x$ and $y$. Therefore, for a system application, they need not be calculated and can be replaced by 1 and 0, respectively.

The calculation of the corrected data according to Equations (7) and (8) or Equations (17) and (18) can be easily implemented by means of a digital computer. As a result, the method will be most useful in systems using digital processing of the aperture data. This may be considered the preferred arrangement for most contemplated uses.

For analog reconstruction, correction values may be stored digitally and applied in analog form through digital to analog converters as the analog holographic data is scanned from the array.

Figure 4:
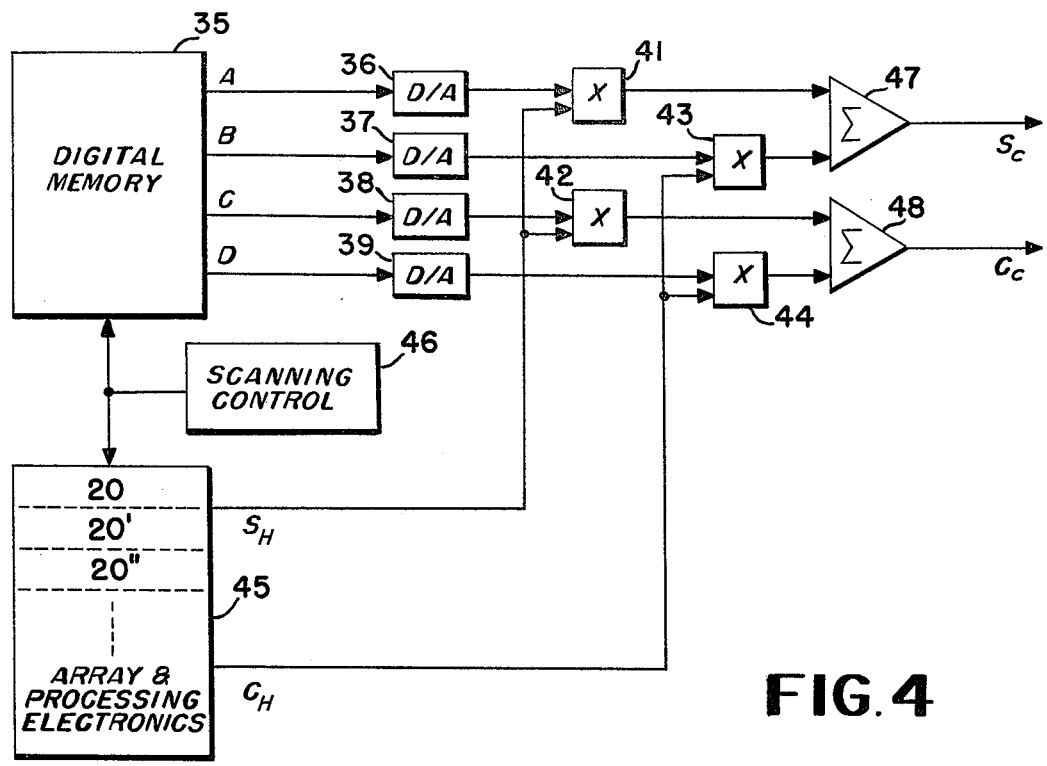
FIG. 4 is a diagrammatic illustration of an analog system according to the invention, utilizing the transducer signal arrangement of FIG. 2.

Referring to FIG. 4, a diagrammatic illustration of a system for performing the above, mathematically described corrections for analog reconstruction and sin cos implementation, (FIG. 2), is illustrated. A digital memory 35 has stored therein a plurality of digital correction signals which are scanned by a scanning control 46 and sequentially transferred to digital-to-analog converters 36, 37, 38 and 39. The digital analog converters 36-39 are connected to multiplier circuits 41, 42, 43, and 44. Multiplying circuits 41 through 44 also receives the sine and cosine hydrophone signals from the array and processing electronics 45 which, as indicated, consists of a plurality of individual hydrophone and processing electronic combinations 20 as illustrated in FIG. 2.

Scanning control 46 is operatively connected to digital memory 35 and array and processing electronics 45 to sequentially sample each of the individual signals as discussed above. Scanning control 46 and digital memory 35 may, if desired, be component parts of standard state-of-the-art mini-computers. One such mini-computer which has proven applicability in the system of the invention is manufactured under the trade name 1602 RUGIDNOVA by the ROLM Company. Of course, other standard make computer arrangements may be utilized, if desired.

The output from the multiplier circuits 41 and 43 are connected to a summing amplifier 47 which produces the corrected sine signal indicated as $S_c$. Similarly, a second summing amplifier 48 receives augend and addend signals from multipliers 42 and 44, respectively, to produce a corrected cosine signal, $C_c$.

Figure 5:
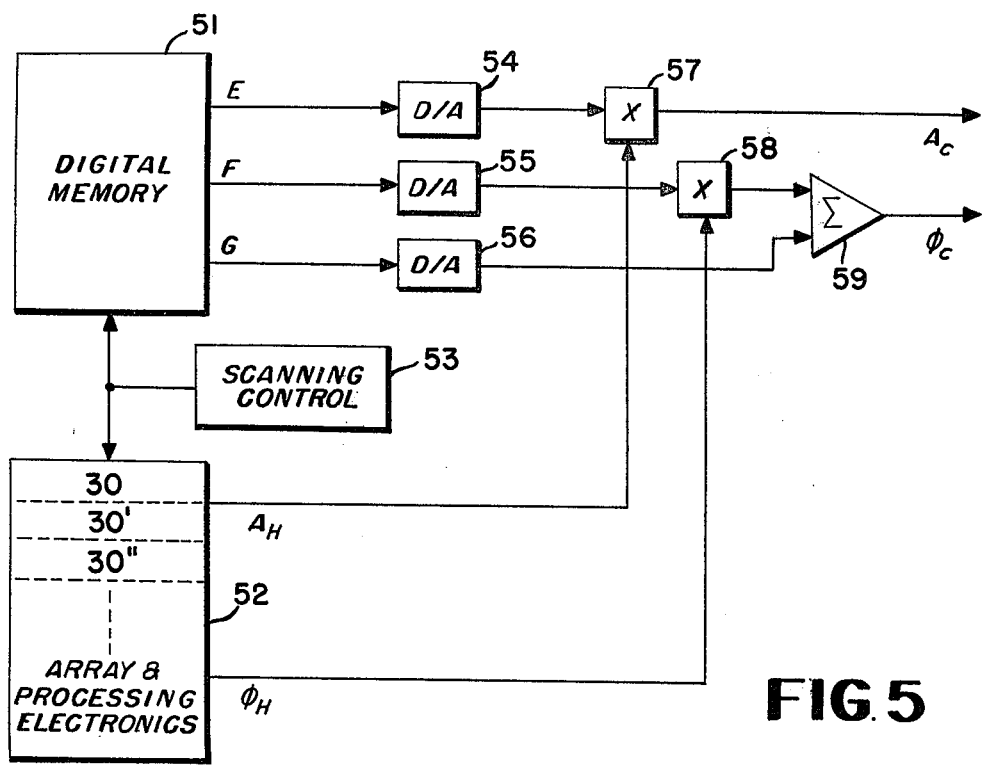
FIG. 5 is a diagrammatic illustration of the invention using an analog version of the transducer processor illustrated in FIG. 3.

Referring to FIG. 5, a diagrammatic illustration of a processing system for use with the amplitude phase type array and processing electronics illustrated in FIG. 3 is described. In this embodiment, digital memory 51 and scanning control 53 may similarly comprise portions of standard mini-computer units. Array and processing electronics 52 similarly include a plurality of amplitude phase circuits 30, 30', 30'', etc. Also, in a similar fashion, the outputs from digital memory 51 are connected to a plurality of digital analog converters 54, 55, and 56 which, in turn, are connected to multiplier 57, 58, and summing amplifier 59. Summing amplifier 59 is fed by multiplier 58 and digital analog converter 56 to implement the aforedescribed mathematical synthesis of the corrected phase signal indicated as $\phi_c$. The output of digital to analog converter 54 is fed to multiplier 57 where it is combined with the hydrophone amplitude signals to produce a corrected amplitude signal, $A_c$. As will be obvious to those versed in the art, with only minor modification the aforedescribed systems could be used with sensor rays having a digital output as well as those having an analog output. An exemplary system corresponding to the system of FIG. 4 is illustrated at FIG. 6.

Figure 6:
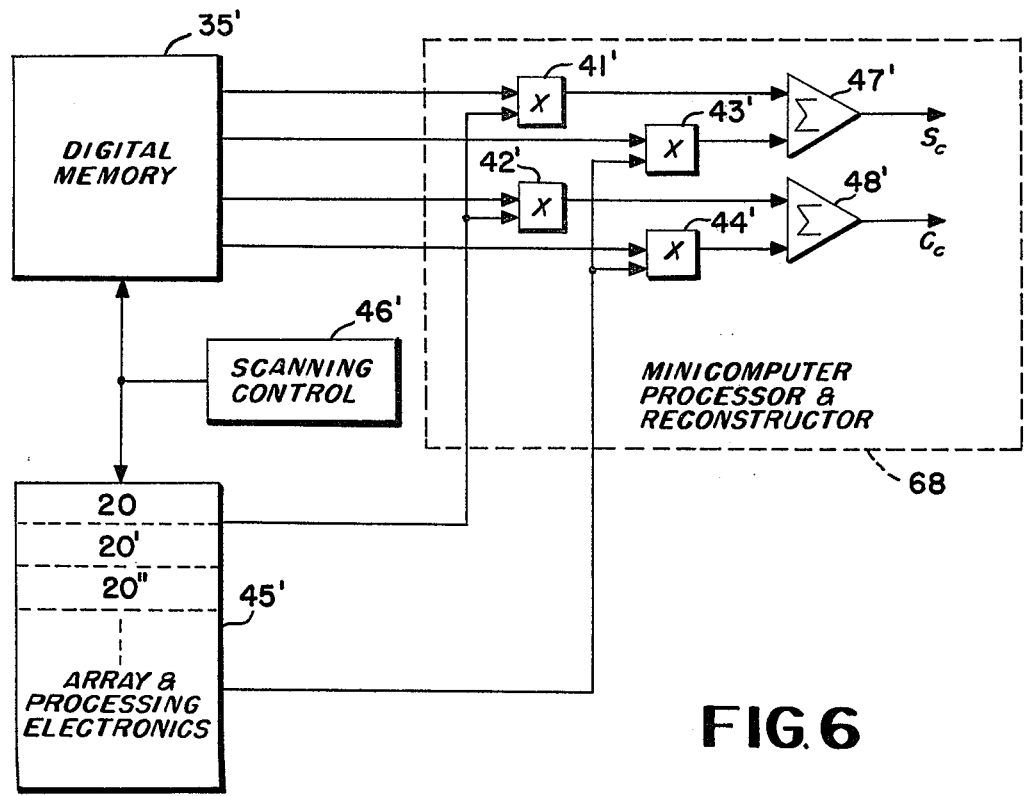
FIG. 6 is a diagrammatic illustration of a system of the invention using a digital form of transducer processor shown in FIG. 2.

Referring to FIG. 6, it will be observed that the same elements are present as in FIG. 4, with the exception of digital-to-analog converters 36–39. Each of these elements, indicated by a primed number corresponds to the similar unprimed number illustrated in FIG. 4. For this reason, further explanation is considered unwarranted for the understanding of the circuit.

Similarly, a digital version of the system illustrated in FIG. 5, not shown, would simply omit digital-to-analog converters 54, 55, and 56.

The aforedescribed individual circuitry arrangements employ standard electronic components and circuits appropriate to the various frequency ranges of the electronic signals being processed, and differ little, other than the manner in which they are used, from similar circuits used in adaptive processing and electronically steerable sensor arrays. Examples of systems in these fields are shown by U.S. Pat. Nos. 3,503,069 to S. E. Lloyd issued on Mar. 24, 1970, and 3,766,559 issued on Oct. 16, 1973, to Wade E. Butcher, Jr. et al. The teachings of which may be considered to be incorporated by reference in this discussion.

METHOD OF OPERATION

Figure 7:
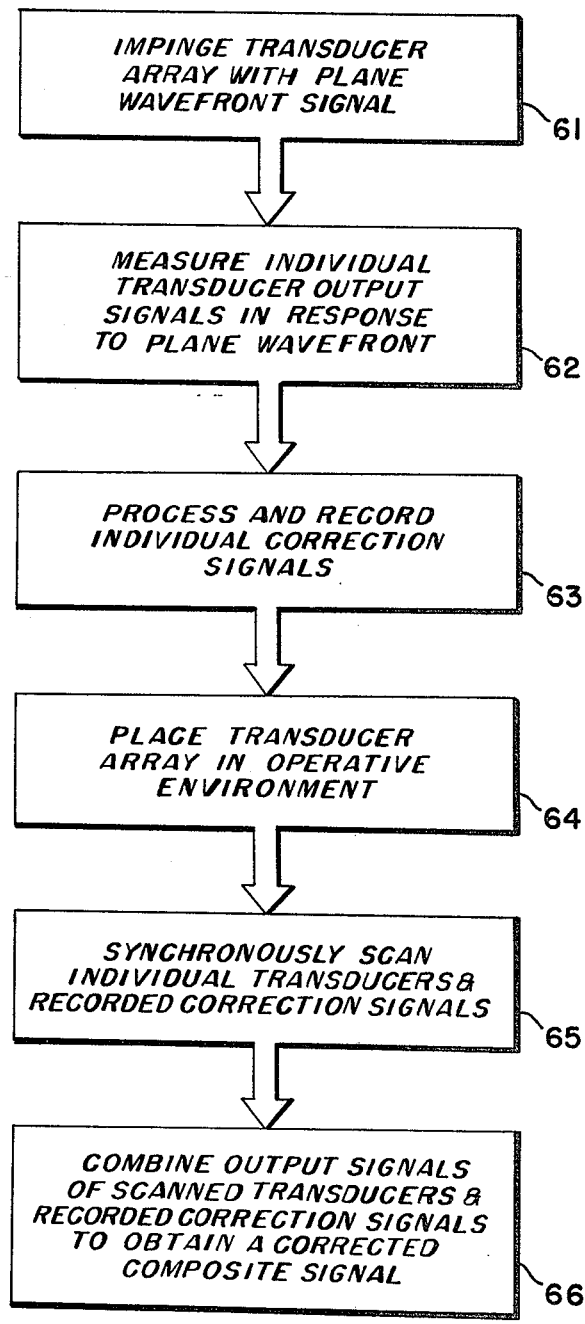
FIG. 7 is a flow diagram illustrating how the method of the invention is to be practiced.

Referring to FIG. 7, a flow diagram of the instant invention is illustrated. The first step in the practice and method of this invention is to impinge the constructed transducer array with a plane wave front signal. This impingement may occur in a laboratory condition or on location. A plane wave front signal may be sufficiently approximated by the use of a signal generator presenting an essential point source of radiation located at a distance from the array and centered within the field of view thereof. This step is indicated by block 61 in the diagram.

The output of each transducer and associated signal processor comprising the array in response to this plane wave is then measured, processed in accord with the aforedescribed equations, and recorded. This recordation may be made directly into the associated memory such as the illustrated memories 35, 51, and 35'. Alternatively, this recordation may utilize a separate recording means to obtain the processed response signal and subsequently entered in the associated memory. These steps of measuring and recording are illustrated, respectively, by blocks 62 and 63 in the diagram.

Next, the transducer array is placed in the operational environment. Of course, if the initial measuring and recording of the transducer signals occur in the operational environment, this step was performed at the commencement of the process and need not be repeated.

Next, in analog systems, the output of the individual hydrophone and associated electronic processing circuit for each transducer is synchronously scanned with its corresponding recorded signal in response to the plane wave impingement. This step is indicated at block 65 in the diagram and may be accomplished by use of standard electronic circuits or, in laboratory analysis, by manual sampling techniques.

Finally, the output signals from the hydrophones and the recorded plane wave front signals are combined by conventional circuitry means, as described above, to produce a composite and corrected signal which may be further processed by conventional means to produce a holographic image having the improved sharpness and contrast earlier alluded to.

The foregoing description taken together with the appended claims constitutes a disclosure such as to enable a person skilled in the signal processing and ranging arts and having the benefit of the teachings contained therein to make and use the invention. Further, the structure herein described and the manipulative steps meet the objects of invention, and generally constitute a meritorious advance in the art unobvious to such a person bereft of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A signal processing method for correction of spatial nonuniformities in a radiation holographic imaging system having a sensor array comprising, in combination, the strips of;
    impinging said sensor array with a plane wavefront;
    measuring the output of the individual sensors in the array in response to the plane wavefront;
    processing the measured output plane wave signals of the individual transducers, and recording the processed output as a retrievable correction signal;
    placing the imaging system in an operational environment;
    receiving radiated signals from said operational environment to generate temporal signals within the sensor array;
    combining individual signals generated in the sensor array by said radiated signals and recorded correction signals to obtain a corrected signal; and
    processing the corrected signal to obtain an image.

2. A signal processing method according to claim 1 in which the step of recording the measured output includes storing digital signals in an accessible memory.

3. A signal processing method according to claim 1 in which said step of impinging said sensor array includes exposing the sensor array to emanation from a distant point source in the far field and at the center of the field of view of the sensor array.

4. A signal processing method according to claim 2 in which said step of impinging said sensor array includes exposing the sensor array to emanation from a distant point source in the far field and at the center of the field of view of the sensor array.

5. A signal processing method according to claim 1 in which the step of combining individual signals and recorded correction signal includes simultaneously scanning said signals by a programmed mini-computer to sample the recorded plane wavefront signals and temporal sensor array signals at a predetermined rate.

6. A signal processing method according to claim 4 in which the step of combining individual signals and recorded correction signals includes simultaneously scanning said signals by a programmed mini-computer to sample the recorded plane wavefront signals and temporal sensor array signals at a predetermined rate.

7. An enhanced hologram signal processing system comprising:
    an array of individual wave energy sensors;
    digital memory means for storing a correction signal associated with the response of said individual wave energy sensors;
    scanning means connected to each of said array of wave energy sensors and said digital memory means for sequential and timely sampling individual wave energy sensors and the associated correction signal in said digital memory means;

signal combining means effectively connected to said digital memory means and said array of individual wave energy sensors for combining the scanned outputs therefrom whereby a corrected signal free from spatial nonuniformities is obtained.

8. An enhanced hologram signal processing system according to claim 7 in which said array of individual wave energy sensors is comprised of electroacoustic transducers.

9. An enhanced hologram signal processing system according to claim 7 in which said digital memory means and said scanning means are component parts of a minicomputer.

10. An enhanced hologram signal processing system according to claim 8 in which said digital memory means and said scanning means are component parts of a mini-computer.

11. An enhanced hologram signal processing system according to claim 7 in which said signal combining means includes a digital-to-analog signal converter.

12. An enhanced hologram signal processing system according to claim 10 in which said signal combining means includes a digital-to-analog signal converter.

13. An enhanced hologram signal processing system according to claim 7 in which said signal combining means includes signal multiplier means for generating a product signal in response to the scanned output from said digital memory means and said individual wave energy sensors.

14. An enhanced hologram signal processing system according to claim 12 in which said signal combining means further includes signal multiplier means for generating a product signal in response to the scanned output from the aforesaid digital memory means and the aforesaid individual wave energy sensors.

* * * * *